United States Patent [19]

Insam et al.

[11] 4,346,448

[45] Aug. 24, 1982

[54] GENERATION OF ELECTRIC SIGNALS HAVING APPROXIMATELY SINUSOIDAL WAVEFORMS

[75] Inventors: Howard F. Insam, Harrow; Stephen R. Laurenson, Stanmore, both of England

[73] Assignee: The General Electric Company, Limited, London, England

[21] Appl. No.: 96,841

[22] Filed: Nov. 23, 1979
(Under 37 CFR 1.47)

[30] Foreign Application Priority Data

Nov. 23, 1978 [GB] United Kingdom ............... 45818/78

[51] Int. Cl.³ ........................ G06F 15/353; G06J 1/00
[52] U.S. Cl. ...................................... 364/607; 328/14; 364/703; 364/721
[58] Field of Search ............... 364/721, 703, 607, 608; 328/14, 15

[56] References Cited

U.S. PATENT DOCUMENTS

| | | | |
|---|---|---|---|
| 3,657,657 | 4/1972 | Jefferson | 364/721 X |
| 3,739,374 | 6/1973 | Klowski | 364/721 X |
| 4,039,951 | 8/1977 | Bruce et al. | 328/14 X |
| 4,109,208 | 8/1978 | Tomisawa et al. | 328/14 X |
| 4,134,072 | 1/1979 | Bolger | 364/721 X |
| 4,142,245 | 2/1979 | Baron | 364/721 X |
| 4,192,007 | 3/1980 | Becker | 364/721 |

*Primary Examiner*—Joseph F. Ruggiero
*Attorney, Agent, or Firm*—Kirschstein, Kirschstein, Ottinger & Cobrin

[57] ABSTRACT

For the purpose of generating an output signal having a sinusoidal waveform, a digital store stores at different locations binary-coded amplitudes at equally spaced instants of time throughout a complete cycle of a sine wave. Those locations are addressed in turn by means of a pulse counter and the signals supplied by the memory are passed to a digital/analogue converter from which the required output signal is derived. The pulse signal supplied to the counter is obtained from a train of clock pulses by a programmable divider. To effect a frequency change in the output signal (for the purpose of signalling binary data), the divisor of the divider is changed in a sequence of steps so that the overall change in output frequency is less abrupt than would otherwise be the case.

The arrangement described is suitable for use in a modem working with the Viewdata system currently adopted by the British Post Office.

12 Claims, 1 Drawing Figure

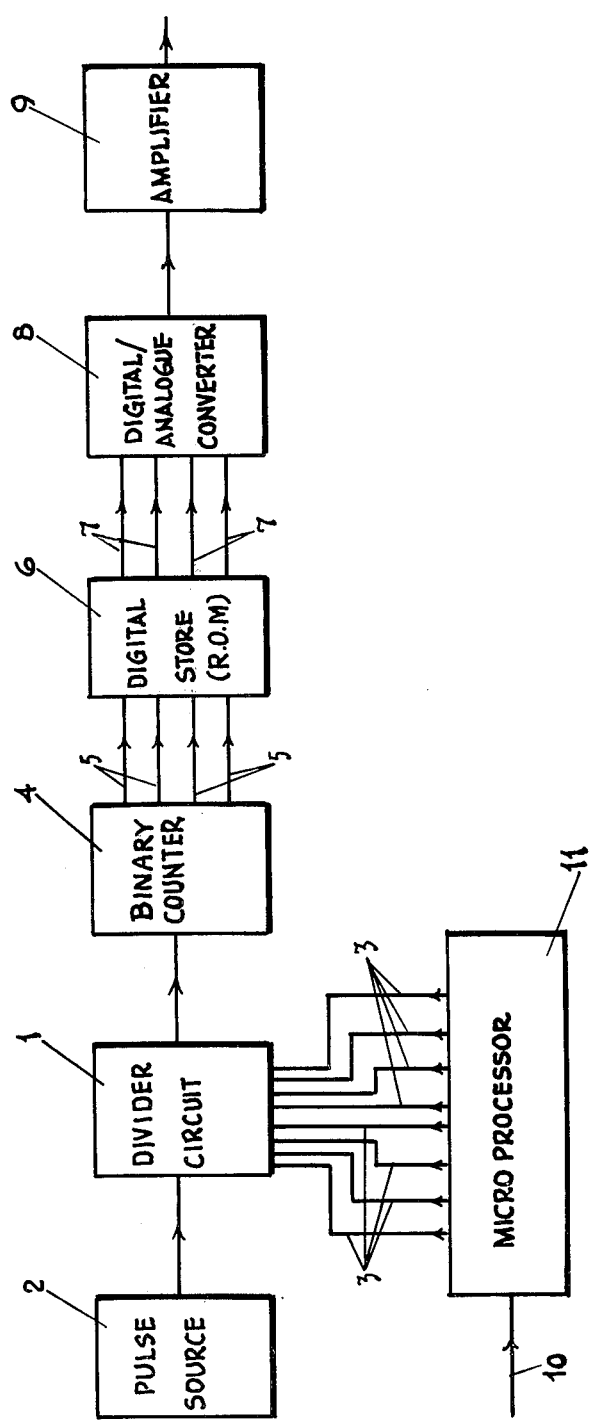

GENERATION OF ELECTRIC SIGNALS HAVING APPROXIMATELY SINUSOIDAL WAVEFORMS

BACKGROUND OF THE INVENTION

This invention relates to methods of generating electric signals having approximately sinusoidal waveforms and to generators for supplying such signals.

More particularly, but not exclusively, the invention is concerned with the generation of electric signals of the kind having an approximately sinusoidal waveform and selectively one or other of two fundamental frequencies.

It is well known to signal binary data by the technique of frequency shift keying. One example of this is in the Viewdata system currently adopted by the British Post Office, data being signalled over a telephone line in one direction at a rate of 75 baud by selectively transmitting oscillations of either 390 or 450 hertz and in the opposite direction at a rate of 1200 baud using oscillations of 1300 and 2100 hertz. Hitherto in generating such oscillations it has been usual for the frequency to be changed abruptly from one value to the other, in response to the data to be signalled, but doing so results in the production of unwanted transients which have to be filtered out before the frequency shift signal is passed to line. Filters for that purpose tend to be expensive and one object of the invention is to generate the frequency shift signal in a novel way so as to reduce the amount of filtering required.

SUMMARY OF THE INVENTION

According to one aspect of the pesent invention, a method of generating an electric signal having an approximately sinusoidal waveform comprises the steps of frequency dividing a first train of pulses to derive a second train of pulses having a lower pulse repetition frequency, utilising the second train of pulses to address in turn locations of a digital store which stores in digital form a plurality of quantized amplitudes of a sine wave, deriving from the signals supplied by the digital store an output signal having an approximately sinusoidal waveform, and making a plurality of progressive alterations to the function by which the frequency of the first train of pulses is divided to form the second train of pulses so as to change the fundamental frequency of the output signal.

According to another aspect of the present invention, a generator for generating an electric signal having an approximately sinusoidal waveform and selectively one or other of two fundamental frequencies comprises a source for supplying a first train of pulses having a repetition frequency F, a divider circuit which is arranged to derive from the first train of pulses a second train of pulses having a repetition frequency $F/N$ whose N is an integer, a digital store which stores in digital form a plurality of quantized amplitudes of a sine wave, a counter which is arranged to respond to said second train of pulses and which supplied signals to address in turn the locations of said digital store at which are stored the quantized sine wave amplitudes, a digital-to-analogue converter which is arranged to respond to the digitised sine wave amplitudes supplied by the digital store so that when, during use, the digital store is addressed as aforesaid the converter supplies an output signal having an approximately sinusoidal waveform, and means operable when the fundamental frequency of the output signal is to be changed to control said divider circuit so that the divisor N is progressively altered in a plurality of steps.

A generator in accordance with the invention operates so that the fundamental frequency of the output signal is gradually changed, i.e. there are less abrupt changes than would otherwise have been the case, and preferably the time over which the divisor N is altered is not less than the period of one cycle of the output signal at the lower frequency thereof.

BRIEF DESCRIPTION OF THE DRAWINGS

One example of a generator in accordance with the present invention will now be described with reference to the accompanying drawing which diagrammatically shows the circuit of the generator.

DESCRIPTION OF THE PREFERRED EMBODIMENTS OF THE INVENTION

Referring to the drawing, the generator comprises a divider circuit 1 to which a pulse source 2 passes a train of pulses having a pulse repetition frequency F. The divider circuit 1 is in fact a counter, which may conveniently be formed of two interconnected four-stage binary counters, and is arranged to supply a train of pulses having a pulse repetition frequency $F/N$, where N is an integer and may have any value up to 256 (i.e. $2^8$) as determined by the value of two-state (i.e. binary) signals on eight leads 3.

A four-stage binary counter 4 responds to the pulse signal supplied by the divider circuit 1 so as to derive four binary signals which are utilised via leads 5 to address in turn sixteen different storage locations of a digital store 6 which is preferably a read only memory. These storage locations of the store 6 have written into them the quantized amplitudes of a sine wave at sixteen equally spaced instants of time throughout a complete cycle of the sine wave, each of these amplitudes being represented by four bits. The decimal values of the binary data stored at the sixteen locations of the store 6, in the order in which those locations are addressed by the counter 4, may be as follows:

0  1  3  6  9  12  14  15  15  14  12  9  6  3  1  0

The binary signals supplied by the store 6 are passed over four leads 7 to a digital-to-analogue converter 8 which operates to supply a signal having a stepped waveform, the amplitudes of the individual steps being proportional to the decimal values given above.

The several storage locations of the store 6 are of course, addressed cyclically and the signal supplied by the converter 8 thus has a waveform which approximates to sinusoidal. The converter 8 is A.C. coupled to an amplifier 9 so as to remove the D.C. component of the signal supplied by the converter 8 and the amplifier 9 may be followed by a simple filter (not shown) to remove the low-amplitude high-frequency ripple to give an output signal having a true sinusoidal waveform.

The arrangement described above may, for example be used to generate a signal having a pseudo-sinusoidal waveform and a nominal frequency of either 390 or 450 hertz. For that purpose the source 2 has a pulse repetition frequency of 921.6 kilohertz and the divisor N is selected to be either 148 or 128, the signals applied to the leads 3 being changed accordingly in dependence upon the 75 baud data signal supplied over a lead 10.

However, as will now be described, a change in the bit value of the signal on the lead 10 does not cause an instantaneous change in the value of N from one of the values just stated to the other.

The device 11 which responds to the signal fed over the lead 10 and which supplies signals to the leads 3 is, in fact, a microprocessor which is programmed so that N is changed progressively at nine instants of time which are equally spaced over about one half a bit period.

The divider circuit 1 operates so that it is set to a particular count (by the signals on the leads 3) at the beginning of each 'divide' cycle and the circuit proceeds to count down the pulses supplied by the source 2 until a zero count is reached (at the end of the cycle) whereupon an output pulse is passed on to the counter 4. It will be appreciated therefore that, when the signals on the leads 3 change to specify a new value of N, the circuit 1 does not immediately commence operating with the new divisor but waits until the current cycle has been completed. The changes in the value of N may follow an approximately raised cosine law (i.e. one in which the rate of change is progressively increased and then decreased). The following table shows the theoretical frequencies required to follow such a law (with nine step changes) together with the values of N which approximate to it and the corresponding fundamental frequencies of the signals supplied by the amplifier 8:

| Theoretical Frequency (Hz) | Divisor N | Actual Output Frequency (Hz) |
|---|---|---|
| 390.0 | 148 | 389.2 |
| 395.9 | 146 | 394.5 |
| 407.4 | 141 | 408.5 |
| 418.2 | 138 | 417.4 |
| 428.0 | 135 | 426.7 |
| 436.3 | 132 | 436.4 |
| 442.8 | 130 | 443.1 |
| 447.4 | 129 | 446.5 |
| 449.6 | 128 | 450.0 |
| 450.0 | 128 | 450.0 |

The above sequence operates, of course, in both directions depending upon whether the output frequency is to be increased or decreased. Instead of following an approximately raised cosine law, the changes in N may alternatively follow an approximately linear law. Furthermore N may be changed in other number of steps, for example eight.

This divider circuit 1 hereinbefore described may conveniently be formed from commercially available integrated circuits for example two integrated circuits type 74193 connected in known manner.

The microprocessor 11 may be the commercially available integrated circuit 6800 type interfaced to the divider circuit 1 by use of a suitable interface such as that of the 6821 type integrated circuit.

We claim:

1. In a method of generating an electric signal having an approximately sinusoidal waveform, said method being of the kind comprising the steps of
(A) frequency dividing a first train of pulses by a factor to derive a second train of pulses having a lower pulse repetition frequency,
(B) utilizing the second train of pulses to address in turn locations of a digital store which stores in digital form a plurality of quantized amplitudes of a sine wave, and
(C) deriving from the signals supplied by the digital store an output signal having an approximately sinusoidal waveform,
the improvement comprising:
(D) making a plurality of progressive alterations to the factor by which the frequency of the first train of pulses is divided to form the second train of pulses so as to change the fundamental frequency of the output signal.

2. In a generator for generating an electric signal having an approximately sinusoidal waveform and selectively one or other of two fundamental frequencies, said generator being of the kind comprising
(A) a source for supplying a first train of pulses having a repetition frequency F,
(B) a divider circuit which is arranged to derive from the first train of pulses a second train of pulses having a repetition frequency F/N, where N is an integer,
(C) a digital store which stores in digital form a plurality of quantized amplitudes of a sine wave,
(D) a counter which is arranged to respond to said second train of pulses and which supplies signals to address in turn the locations of said digital store at which are stored the quantized sine wave amplitudes, and
(E) a digital to analogue converter which is arranged to respond to the digitized sine wave amplitudes supplied by the digital store so that when, during use, the digital store is addressed as aforesaid the converter supplies an output signal having an approximately sinusoidal waveform,
the improvement comprising:
(F) means operable when the fundamental frequency of the output signal is to be changed to control said divider so that the divisor N is progressively altered in a plurality of steps.

3. The improvement in a generator as claimed in claim 2 in which the time over which the divisor N is altered is not less than the period of one cycle of the output signal at the lower frequency thereof.

4. The improvement in a generator as claimed in claim 2 in which the counter is formed of two interconnected four-stage binary counters.

5. The improvement in a generator as claimed in claim 2 in which the divisor N is identified by a group of binary signals.

6. The improvement in a generator as claimed in claim 5 wherein eight binary signals identify the value of the divisor N at any time.

7. The improvement in a generator as claimed in claim 2 in which the digital store is a read only memory.

8. The improvement in a generator as claimed in claim 2 in which the digital store stores sixteen quantized amplitudes of a sine wave.

9. The improvement in a generator as claimed in claim 2 in which the divisor N is progressively altered in nine steps.

10. The improvement in a generator as claimed in claim 2 in which the repetition frequency F is 921.6 kiloherz while the lowest value of N is 128 and the highest value of N is 148.

11. The improvement in a generator as claimed in claim 2 in which the changes in the value of N follow an approximately raised cosine law.

12. The improvement in a generator as claimed in claim 2 in which the changes in the value of N follow an approximately linear law.

* * * * *